United States Patent
Elwan et al.

(10) Patent No.: US 7,536,203 B2
(45) Date of Patent: May 19, 2009

(54) PORTABLE MEMORY DEVICE AND METHOD

(75) Inventors: Hassan Elwan, Lake Forest, CA (US); Adel F. Fanous, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 535 days.

(21) Appl. No.: 11/367,669

(22) Filed: Mar. 3, 2006

(65) Prior Publication Data

US 2007/0206118 A1 Sep. 6, 2007

(51) Int. Cl.
*H04B 1/38* (2006.01)
*H04M 1/00* (2006.01)

(52) U.S. Cl. .................. 455/558; 455/514; 455/131; 455/142; 455/168.1; 365/185.17; 365/185.24

(58) Field of Classification Search ............. 455/3.02, 455/466, 21, 130, 558, 39, 514, 131, 142, 455/168.1, 309, 337; 235/375, 439, 492; 365/185.17, 185.24

See application file for complete search history.

(56) References Cited

U.S. PATENT DOCUMENTS

| | | |
|---|---|---|
| 2003/0182393 A1 | 9/2003 | Tobin et al. |
| 2004/0116088 A1 | 6/2004 | Ellis et al. |
| 2005/0154941 A1 | 7/2005 | Lee et al. |
| 2007/0013601 A1* | 1/2007 | Atkinson et al. ............ 343/873 |
| 2007/0113260 A1* | 5/2007 | Pua et al. .................... 725/134 |

* cited by examiner

*Primary Examiner*—Tuan A Pham
(74) *Attorney, Agent, or Firm*—Rahman LLC

(57) ABSTRACT

A portable memory device and method comprises a data storage component; and a wireless receiver operatively connected to the data storage component, wherein the wireless receiver is adapted to receive mobile TV signals. The portable memory device further comprises an interface component adapted to connect to a host computing device. The wireless receiver is adapted to receive radio signals. The wireless receiver is adapted to receive satellite signals. The wireless receiver comprises an antenna; a matching network operatively connected to the antenna; and a radio frequency (RF) receiver chip operatively connected to the matching network. The portable memory device further comprises a demodulator operatively connected to (or integrated in) the RF receiver chip. The data storage component comprises a flash memory unit comprising software code adapted to interface with a host computing device and process data on the host computing device.

26 Claims, 2 Drawing Sheets

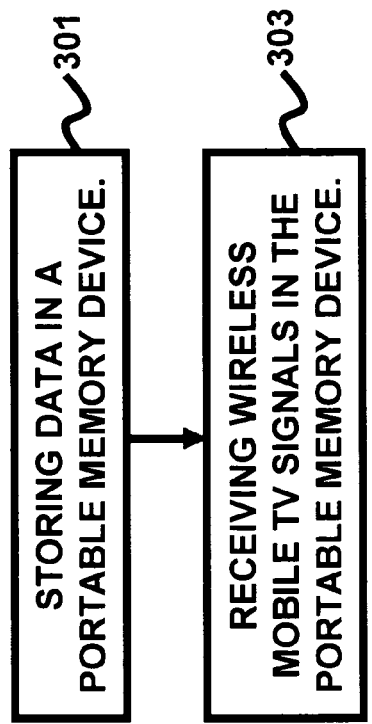
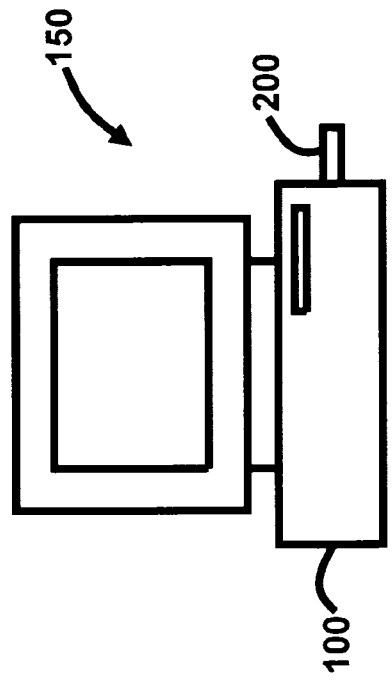
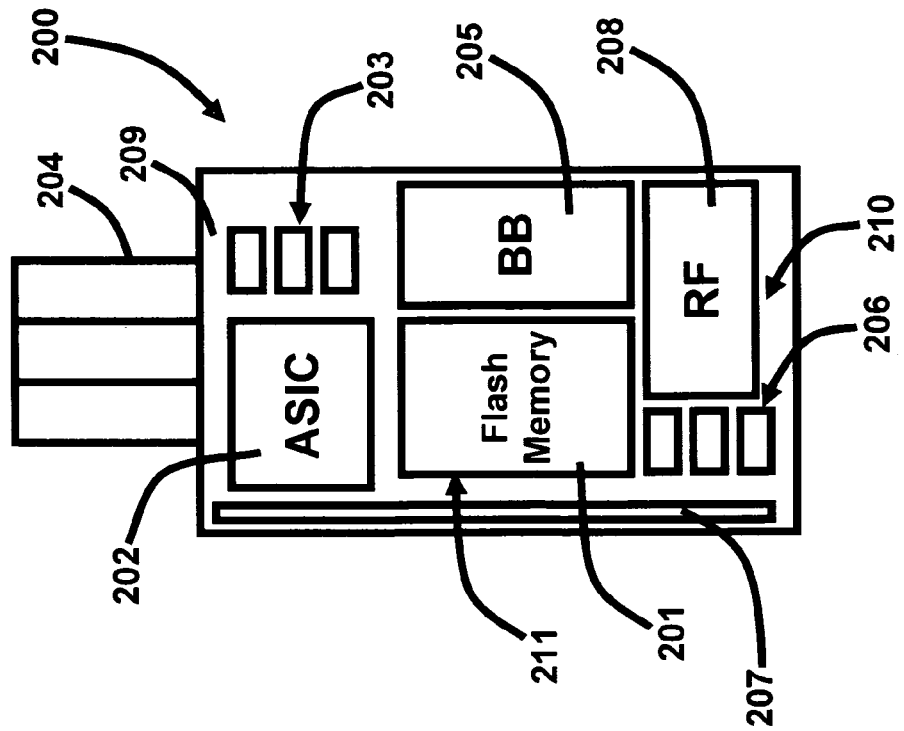

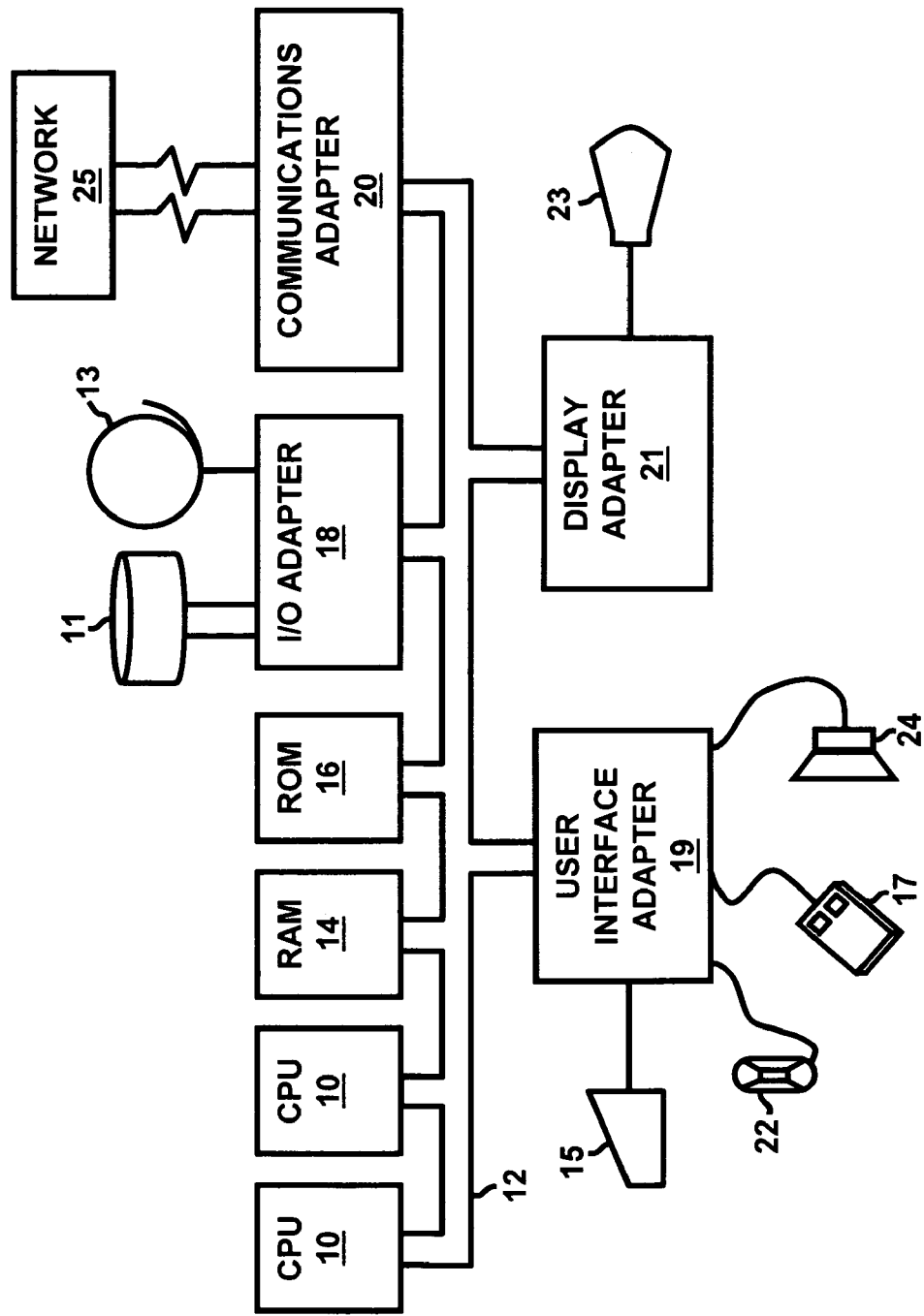

PORTABLE MEMORY DEVICE AND METHOD

BACKGROUND

1. Technical Field

The embodiments herein generally relate to wireless technologies, and, more particularly, to portable memory devices for use with wireless technologies.

2. Description of the Related Art

Monolithic integrated circuit (IC) implementation for radio and mobile television (TV) is a growing field. These devices provide the ability to receive wireless signals in a small form factor. The main application of these devices is for cell phones. Thus, they rely on the cell phone battery for operation. This provides limited operation time and consumes the battery power of the phone. Furthermore, displaying the data in any audio/visual form relies on the capabilities of the cell phone itself. Thus, it is limited in terms of display screen size and audio output ability.

The concept of a memory stick, universal serial bus (USB) flash drive, or jump drive is well established in the computer industry. Typical portable memory devices simply provide storage and retrieving capabilities of the contents contained therein, and as such are primarily storage devices. Accordingly, there remains a need for portable memory device that is capable of providing additional functionalities other than simply storing and retrieving data from a host device.

SUMMARY

In view of the foregoing, an embodiment herein provides a portable memory device dimensioned and configured as any of a removable flash memory card, a USB flash drive, and a jump drive, wherein the portable memory device comprises a data storage component; and a wireless receiver operatively connected to the data storage component, wherein the wireless receiver is adapted to receive wireless signals. The portable memory device may further comprise an interface component adapted to connect to a host computing device. Additionally, the wireless signals may comprise any of mobile TV and radio signals. Also, the wireless receiver may be adapted to receive satellite signals. Preferably, the wireless receiver comprises an antenna; a matching network operatively connected to the antenna; and a radio frequency (RF) receiver chip operatively connected to the matching network. The portable memory device may further comprise a demodulator operatively connected to the RF receiver chip. The portable memory device may further comprise a demodulator integrated in the RF receiver chip. Furthermore, the data storage component preferably comprises a flash memory unit comprising software code adapted to interface with a host computing device and process data on the host computing device.

Another embodiment provides a system for storing data and receiving wireless signals, wherein the system comprises a portable memory device comprising a data storage component; and a wireless receiver operatively connected to the data storage component, wherein the wireless receiver is adapted to receive mobile TV signals. The system may further comprise an interface component adapted to connect to a host computing device. Preferably, the wireless receiver is adapted to receive radio signals. Moreover, the wireless receiver is preferably adapted to receive satellite signals. The wireless receiver may comprise an antenna; a matching network operatively connected to the antenna; and a RF receiver chip operatively connected to the matching network. The system may further comprise a demodulator operatively connected to the RF receiver chip. Additionally, the system may further comprise a demodulator integrated in the RF receiver chip. Preferably, the data storage component comprises a flash memory unit comprising software code adapted to interface with a host computing device and process data on the host computing device. Additionally, the portable memory device may comprise any of a removable flash memory card, a USB flash drive, and a jump drive.

Another embodiment provides a method comprising storing data in a portable memory device; and receiving wireless mobile TV signals in the portable memory device. The method may further comprise connecting the portable memory device to a host computing device. Additionally, the method may further comprise receiving radio signals in the portable memory device. Moreover, the method may further comprise receiving satellite signals in the portable memory device. Preferably, reception of the wireless mobile TV signals is performed by a wireless receiver configured in the portable memory device, wherein the wireless receiver comprises an antenna; a matching network operatively connected to the antenna; and a RF receiver chip operatively connected to the matching network. The method may further comprise operatively connecting a demodulator to the RF receiver chip. Also, the method may further comprising integrating a demodulator in the RF receiver chip. Preferably, data storage in the portable memory device is performed by a data storage component, the data storage component comprising a flash memory unit comprising software code adapted to interface with a host computing device and process data on the host computing device. The method may further comprise configuring the portable memory device as any of a removable flash memory card, a USB flash drive, and a jump drive.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 illustrates a schematic diagram of a portable memory device with wireless signal reception capability according to an embodiment herein;

FIG. 2 is a flow diagram illustrating a preferred method according to an embodiment herein;

FIG. 3 is a system diagram according to an embodiment herein; and

FIG. 4 is a schematic diagram of a computer system according to an embodiment herein.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an active portable memory device that is capable of providing additional functionalities other than simply storing and retrieving data from a host device. The embodiments herein achieve this by providing a portable memory device that combines a USB flash drive with a wireless system capable of receiving TV or radio related signals. Referring now to the drawings, and more particularly to FIGS. 1 through 4, where similar reference characters denote corresponding features consistently throughout the figures, there are shown preferred embodiments.

FIG. 1 illustrates a portable memory device 200, such as a USB drive, according to an embodiment herein. The portable memory device 200 comprises a memory chip 201 such as flash memory, an application specific integrated circuit (ASIC) 202, other supporting components 203 (which may comprise discrete components such as resistors and capacitors as well as some supporting integrated circuits such as voltage regulators), a USB plug 204 operable for USB interface with a host device 100 (of FIG. 3) such as a personal computer, a broadband demodulator device 205, a matching network 206, an antenna 207, and a wireless RF device 208 all configured on a circuit board 209.

The device 200 picks up a wireless signal to be received by the antenna 207. The network 206 provides a proper impedance matching between the RF device 208 and the antenna 207 that enables a better reception of the required signal band. The RF device 208 is responsible for down converting the signal from high frequency bands to lower frequencies where the signal can be amplified and properly filtered. This signal is then processed by the demodulator device 205 and is properly demodulated and may be converted to a pure digital video format that can be conveyed to the host device 100. The ASIC device 202 coordinates the use of the device 200 as a wireless receiver and a portable storage device. The ASIC device 202 also controls the demodulator device 205 and RF wireless device 208 and provides access to a host USB bus (not shown) through the USB interface 204. The ASIC 202 also controls the data transfer to and from the flash memory 201 and provides all of the signals required to synchronize the operation of the flash memory 201, demodulator device 205, and antenna 207 with the host 100.

The memory chip 201 may be configured in any suitable size (for example, 1 GB data storage capabilities, etc.). Preferably, the device 200 utilizes software placed on the memory chip 201 to interface with the host device 100 thus transferring and appropriately processing and displaying data from the wireless device 208. Software code is read by the ASIC 202 for providing a user interface with the host device 100. Using this software a user can transfer data between the host device 100 and the portable device 200. Furthermore, the received signals from the wireless device 208 can be stored on the flash memory 201 for future retrieval. The device 200 thus provides a user with multiple functionality in a single device. The wireless data can be presented (audio/visual) using the capabilities of the host device 100. The device 200 also draws power from the host 100. Hence, if the host 100 is a desktop computer, then operation time of the portable device 200 is not be limited by battery power.

To enable the device 200 to receive wireless information such as TV or radio signals, a complete wireless receiver 210 is integrated in the USB drive 200. FIG. 1 shows the wireless component blocks capable of bringing wireless reception to the drive 200. These component blocks generally include the antenna 207, matching network 206, RF receiver chip 208, and the demodulator 205. In the case of a single chip receiver, both the demodulator function and the RF receiver function are integrated in the same device. By using highly integrated monolithic devices, the wireless receiver 210 can be realized in a small form factor that permits its inclusion within the small USB-drive size. The wireless receiver 210 generally comprises the antenna 207, matching network 206, demodulator 205, and RF receiver chip 208. Additional software code is also added on the flash memory 201 to handle the interface with the host 100 as well as the processing of data on the host device 100. The addition of such a function on to the USB drive 200 clearly offers an added value over the conventional USB-drives.

Using the software in the device 200, data can be displayed on the host computer 100. For example, in the case of TV wireless reception, data standards such as DVB-H, ISDB-T, DVB-T, etc. are possible. In the case of radio reception, AM/FM/satellite, etc. are possible. Moreover, the received audio signals can be boosted to the host speakers (not shown). In both cases the received signals can also be stored on the flash memory 201 of the USB drive 200 for future retrieval. In its most generic form, the wireless section operates in a multi mode/multi band; hence the device 200 can receive multiple radio transmission standards (AM/FM) and multiple mobile TV standards (DVB-H/ISDB-T/DVB-T) and bands (VHF/UHF/L-Band transmissions). This ability depends on the capabilities of the wireless receiver 208 used in realizing the wireless radio section of the portable device 200. If the RF device 208 provides multi-band and multi-standard reception, then the device 200 can be used for reception of more than one standard. For example if the RF device 208 is capable of receiving FM radio as well as DVB-H signals, then the same device 200 can provide FM audio output or TV signals (for example, in a DVB-H standard).

FIG. 2, with reference to FIGS. 1 and 3, illustrates a flow diagram illustrating a method according to an embodiment herein, wherein the method comprises storing (301) data in a portable memory device 200 and receiving (303) wireless mobile TV signals in the portable memory device. The method may further comprise connecting the portable memory device 200 to a host computing device 100. Additionally, the method may further comprise receiving radio signals in the portable memory device 200. Moreover, the method may further comprise receiving satellite signals in the portable memory device 200. Preferably, reception of the wireless mobile TV signals is performed by a wireless receiver 210 configured in the portable memory device 200, wherein the wireless receiver 210 comprises an antenna 207; a matching network 206 operatively connected to the antenna 207; and a RF receiver chip 208 operatively connected to the matching network 206.

The method may further comprise operatively connecting a demodulator 205 to the RF receiver chip 208. Alternatively, the method may further comprising integrating the demodulator 205 in the RF receiver chip 208. Preferably, data storage in the portable memory device 200 is performed by a data storage component 211 comprising a flash memory unit 201 comprising software code adapted to interface with a host computing device 100 and process data on the host computing device 100. The method may further comprise configuring the portable memory device 200 as any of a removable flash memory card, a USB flash drive, and a jump drive.

The circuitry provided by the embodiments herein may be used with the fabrication of an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product.

The embodiments herein can take the form of an embodiment including both hardware and software elements. Preferably, the software embodiments include, but are not limited, to firmware, resident software, microcode, etc. Furthermore, the method embodiments herein can be incorporated into a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 3, with reference to FIG. 1, illustrates a system 150 for storing data and receiving wireless signals, wherein the system 150 comprises a portable memory device 200 comprising a data storage component 211 and a wireless receiver 210 operatively connected to the data storage component 211, wherein the wireless receiver 210 is adapted to receive mobile TV signals. The system 150 may further comprise an interface component 204 adapted to connect to a host computing device 100. Preferably, the wireless receiver 210 is adapted to receive radio signals. Moreover, the wireless receiver 210 is preferably adapted to receive satellite signals. The wireless receiver 210 may comprise an antenna 207; a matching network 206 operatively connected to the antenna 207; and a RF receiver chip 208 operatively connected to the matching network 206. The system 150 may further comprise a demodulator 205 operatively connected to the RF receiver chip 208. Additionally, the system 150 may further comprise a demodulator 205 integrated in the RF receiver chip 208. Preferably, the data storage component 211 comprises a flash memory unit 201 comprising software code adapted to interface with a host computing device 100 and process data on the host computing device 100. Additionally, the portable memory device 200 may comprise any of a removable flash memory card, a USB flash drive, and a jump drive.

A representative hardware environment for practicing the software embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Generally, the embodiments herein provide a user with the ability to receive wireless signals (such as TV or radio signals) on any host system 100 in the same device that the user employs as a USB drive. The user can also conveniently record the received data on the same device 200 (i.e., record TV programs on the device 200). As mentioned, stand-alone USB drive technology is well developed and deployed in the market. However, the main use of this technology is generally to save data from a host 100. The standard USB drive is not equipped to receive and adequately process wireless RF signals that pertain to radio (AM/FM, satellite), TV, or mobile TV (DVB-H, ISDB-T, etc.). Accordingly, the embodiments herein provide a convenient USB drive device 200 with the associated capabilities of the host 100 to enable the user to receive process and store wireless data.

The embodiments herein can be used as USB drives to enhance its functionalities and offer a new dimension for USB drive usage (i.e., include wireless reception capabilities on the device 200 itself). This utilizes the USB interface 204, small form factor of the USB drive, and the associated flash memory 201 and software to provide wireless reception and display on any host 100 (for example, PC, laptop, DVD player, wireless TV sets, cell phones, MP3 players, etc.). It also can be used in association with a host computer process and display the data. The embodiments herein may also enhance the use of the DVB-H and ISDB-T wireless standards in devices other than a cell phone.

Images received by the portable device 200 can be saved in the flash memory 201, transmitted to a host device 100, and viewed or printed from the host device 100. Received programs can be transmitted over a network to all connected devices. Hence many different users operating on the same network can watch or listen to the program simultaneously. Moreover, audio and video programs can be saved for later retrieval or editing.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A portable memory device dimensioned and configured as any of a removable flash memory card, a universal serial bus (USB) flash drive, and a jump drive, said portable memory device comprising:
    a data storage component;
    a multi-mode and multi-band wireless receiver directly connected to said data storage component, wherein said wireless receiver comprises:
        an antenna adapted to capture wireless signals comprising mobile television (TV), AM, FM, and satellite signals alone or in combination with one another;
        a matching network operatively connected to said antenna; and
        a radio frequency (RF) receiver chip operatively connected to said matching network,
    a demodulator operatively connected to said RF receiver chip, wherein said demodulator is located separate from said antenna and said RF receiver chip; and
    an application specific integrated circuit (ASIC) that controls said wireless receiver and said demodulator and controls data transfer to and from said data storage component and provides all signals required to synchronize operation of said data storage component, said demodulator, and said antenna.

2. The portable memory device of claim 1, further comprising an interface component adapted to directly connect said portable memory device to a host computing device.

3. The portable memory device of claim 1, wherein said data storage component comprises a flash memory unit comprising software code adapted to interface with a host computing device and process data on said host computing device.

4. A system for storing data and receiving wireless signals, said system comprising a host computing device directly connected to a portable memory device, wherein said portable memory device comprises:
    a data storage component;
    a multi-mode and multi-band wireless receiver directly connected to said data storage component, wherein said wireless receiver comprises:
        an antenna adapted to capture wireless signals comprising mobile television (TV), AM, FM, and satellite signals alone or in combination with one another;
        a matching network operatively connected to said antenna; and
        a radio frequency (RF) receiver chip operatively connected to said matching network,
    a demodulator operatively connected to said RF receiver chip, wherein said demodulator is located separate from said antenna and said RF receiver chip; and
    an application specific integrated circuit (ASIC) that controls said wireless receiver and said demodulator and controls data transfer to and from said data storage component and provides all signals required to synchronize operation of said data storage component, said demodulator, and said antenna with said host computing device.

5. The system of claim 4, further comprising an interface component adapted to connect said portable memory device to said host computing device.

6. The system of claim 4, wherein said data storage component comprises a flash memory unit comprising software code adapted to interface with said host computing device and process data on said host computing device.

7. The system of claim 4, wherein said portable memory device comprises any of a removable flash memory card, a universal serial bus (USB) flash drive, and a jump drive.

8. A method comprising:
    storing data in a portable memory device;
    receiving wireless signals in said portable memory device, wherein said wireless signals comprise mobile television (TV), AM, FM, and satellite signals, and wherein reception of said wireless signals is performed by a multi-mode and multi-band wireless receiver configured in said portable memory device, wherein said wireless receiver comprises:
        an antenna adapted to capture said wireless signals:
        a matching network operatively connected to said antenna; and
        a radio frequency (RF) receiver chip operatively connected to said matching network
    demodulating said wireless signals in a demodulator that is operatively connected to said RF receiver chip, wherein said demodulator is located separate from said antenna and said RF receiver chip; and
    controlling, using an application specific integrated circuit (ASIC), said wireless receiver, said demodulator, and data transfer to and from said data storage component, wherein said ASIC provides all signals required to synchronize operation of said data storage component, said demodulator, and said antenna.

9. The method of claim 8, further comprising directly connecting said portable memory device to a host computing device, and non-wirelessly transferring said data and said wireless signals from said portable memory device to said host computing device.

10. The method of claim 8, wherein data storage in said portable memory device is performed by a data storage component, said data storage component comprising a flash memory unit comprising software code adapted to interface with a host computing device and process data on said host computing device.

11. The method of claim 8, further comprising configuring said portable memory device as any of a removable flash memory card, a universal serial bus (USB) flash drive, and a jump drive.

12. The portable memory device of claim 1, further comprising:
 a circuit board that holds said data storage component, said wireless receiver, said demodulator, and said ASIC; and
 discrete electrical components embedded on said circuit board.

13. The portable memory device of claim 12, wherein said discrete electrical components comprise resistors and capacitors.

14. The portable memory device of claim 12, wherein said discrete electrical components comprise supporting integrated circuits.

15. The portable memory device of claim 14, wherein said supporting integrated circuits comprise a voltage regulator.

16. The portable memory device of claim 1, wherein said matching network provides a proper impedance matching between said RF receiver chip and said antenna, and wherein said RF receiver chip down coverts said wireless signal from high frequency bands to lower frequencies in order to facilitate signal amplification and filtering.

17. The system of claim 4, wherein said portable memory device further comprises:
 a circuit board that holds said data storage component, said wireless receiver, said demodulator, and said ASIC; and
 discrete electrical components embedded on said circuit board.

18. The system of claim 17, wherein said discrete electrical components comprise resistors and capacitors.

19. The system of claim 17, wherein said discrete electrical components comprise supporting integrated circuits.

20. The system of claim 19, wherein said supporting integrated circuits comprise a voltage regulator.

21. The system of claim 4, wherein said matching network provides a proper impedance matching between said RF receiver chip and said antenna, and wherein said RF receiver chip down coverts said wireless signal from high frequency bands to lower frequencies in order to facilitate signal amplification and filtering.

22. The method of claim 8, further comprising:
 placing said data storage component, said wireless receiver, said demodulator, and said ASIC on a circuit board; and
 embedding discrete electrical components on said circuit board.

23. The method of claim 22, wherein said discrete electrical components comprise resistors and capacitors.

24. The method of claim 22, wherein said discrete electrical components comprise supporting integrated circuits.

25. The method of claim 24, wherein said supporting integrated circuits comprise a voltage regulator.

26. The method of claim 8, wherein said matching network provides a proper impedance matching between said RF receiver chip and said antenna, and wherein said RF receiver chip down coverts said wireless signal from high frequency bands to lower frequencies in order to facilitate signal amplification and filtering.

* * * * *